UNITED STATES PATENT OFFICE.

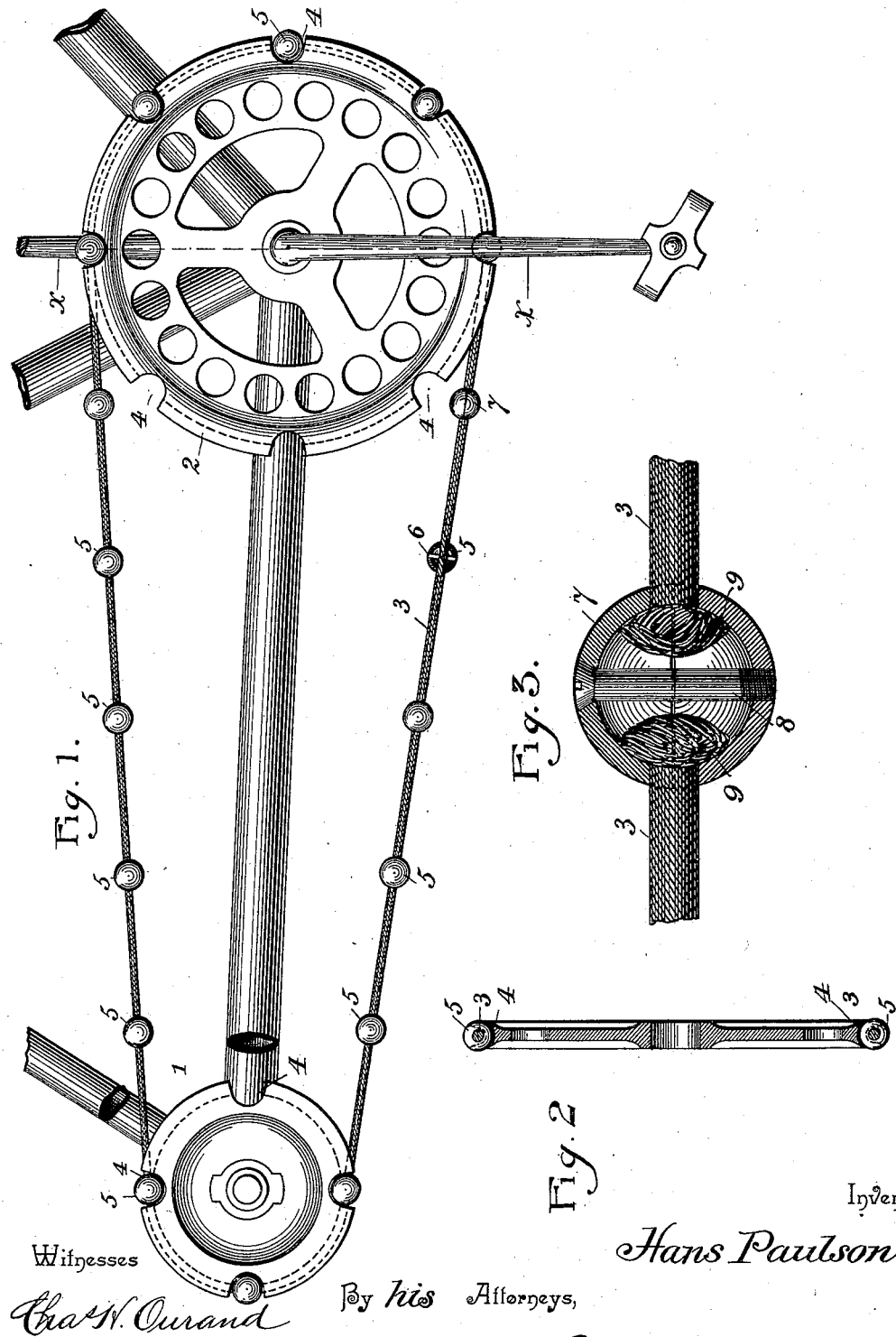

HANS PAULSON, OF SUMNER, WASHINGTON, ASSIGNOR OF ONE-HALF TO HERMAN KLABER, OF TACOMA, WASHINGTON.

MEANS FOR TRANSMITTING POWER.

SPECIFICATION forming part of Letters Patent No. 620,169, dated February 28, 1899.

Application filed October 30, 1897. Serial No. 656,929. (No model.)

*To all whom it may concern:*

Be it known that I, HANS PAULSON, a citizen of the United States, residing at Sumner, in the county of Pierce and State of Washington, have invented a new and useful Means for Transmitting Power, of which the following is a specification.

This invention relates to means for transmitting power from the crank-axle of a bicycle or like vehicle to the drive-wheel and is intended to replace the ordinary sprocket or drive chain, the purpose being to reduce the friction and weight and to diminish the wear and obviate the collecting of dust and dirt, which impede the action of the ordinary drive-chain and are the chief source of its rapid wearing when not oiled and cleaned.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a view in elevation, showing the invention in operative relation. Fig. 2 is a transverse section on the line X X of Fig. 1. Fig. 3 is a detail view showing the instrumentalities for coupling the ends of the cable.

Corresponding and like parts are referred to in the following description and indicated in the several views of the drawings by the same reference characters.

The pulleys 1 and 2, which receive and support the cable 3, represent the parts applied, respectively, to the drive-wheel and crank-axle of a bicycle or like machine, said pulleys being grooved in their periphery and provided at intervals with notches 4 to snugly receive balls 5, secured at intervals in the length of the wire rope or cable 3, thereby insuring positive engagement between the operating parts and obviating any slipping.

The rope or cable 3 is constructed of a series of steel wires or strands in the usual manner of forming metallic ropes or cables and is flexible, so as to conform readily to the circumference of the pulleys around which it passes. The balls 5, of steel, are strung upon the wire cable and are properly spaced apart and are held in place by pins 6, driven therethrough and through the cable, as clearly indicated in Fig. 1. Each of the balls 5 is formed with a diametrical opening or passage for the reception of the cable and is provided with an opening at right angles to said passage and intersecting therewith to receive the pin 6, by means of which the position of the ball is fixed when placed upon the cable. The terminals of the cable are connected by a ball 7, similar in external appearance to the balls 5, but made hollow and formed in two equal parts, which are secured together by a machine-screw 8, passing through openings formed centrally in the complementary parts of the ball, the head of the screw being countersunk in one half or part and its opposite end making screw-thread connection with the other half or part. The halves or parts of the ball 7 are notched, and these notches when the parts are placed together form openings to receive the terminals of the wire cable 3, said terminals being upset or headed, as shown at 9, to prevent their withdrawal when the parts of the ball 7 are secured by means of the fastening 8. The balls 5 are placed in position upon the cable 3, after which its terminals are upset or headed, as indicated at 9, and are brought together, so as to pass within the hollow ball 7, when its parts or halves are fitted together and secured by means of the screw 8.

For transmitting the power from the crank-axle to the drive-wheel of a bicycle or like machine the wire cable 3 need only be about a quarter of an inch in diameter, and is therefore much lighter than the drive or sprocket chain generally employed and is less liable to wear, because devoid of articulating elements, and conforms more readily to the surface of the pulleys imparting and receiving the power by means of which the machine is propelled.

Having thus described the invention, what is claimed as new is—

In a device of the class described, a driving-cable carrying balls at intervals thereon, and provided with integral upset or headed terminals, a hollow spherical coupling-ball, consisting of complementary semispherical sections or halves having registering notches at their meeting edges receiving the terminals of the coupling, whose upset or headed portions are confined within and bear against the inner walls of the ball-sections, and an interior fastening detachably connecting the sections of the ball and extending transversely across the open space within the ball between the upset and headed terminals of the cable, substantially as set forth.

In testimony that I claim the foregoing as my own I have hereto affixed my signature in the presence of two witnesses.

HANS PAULSON.

Witnesses:
GUSTAV BEUTLICH,
EMIL KORACH.